United States Patent [19]
Jumelle

[11] 3,941,313
[45] Mar. 2, 1976

[54] JET ENGINE NACELLE WITH DRAG AUGMENTER AUXILIARY FOR THRUST-REVERSER SYSTEM

[75] Inventor: Louis Francois Jumelle, Ris-Orangis, France

[73] Assignee: Societe Nationale d'Etude et de Construction de Moteurs d'Aviation, Paris, France

[22] Filed: Nov. 29, 1974

[21] Appl. No.: 528,480

Related U.S. Application Data

[63] Continuation-in-part of Ser. No. 338,531, March 6, 1973.

[30] Foreign Application Priority Data

Mar. 6, 1972  France .................................. 72.07726

[52] U.S. Cl. .... 239/265.29; 239/265.31; 244/110 B; 60/230
[51] Int. Cl.² ..................................... B64C 15/06
[58] Field of Search ............ 244/110 B, 110 D, 113, 244/12 D, 23 D, 52, 53 R; 239/265.19–265.31; 60/226 A, 227, 228, 229, 230

[56] References Cited
UNITED STATES PATENTS

| | | | |
|---|---|---|---|
| 3,050,937 | 8/1962 | James et al. ................... | 239/265.25 |
| 3,068,646 | 12/1962 | Fletcher ........................ | 60/226 A |
| 3,097,484 | 7/1967 | Andre et al. .................. | 60/229 |
| 3,353,355 | 11/1967 | Jordan .......................... | 244/113 |
| 3,541,794 | 11/1970 | Johnston et al. .............. | 239/265.31 |
| 3,604,629 | 9/1971 | Colville ........................ | 239/265.31 |
| 3,608,314 | 9/1971 | Colley .......................... | 239/265.31 |
| 3,612,401 | 10/1971 | Ellis .............................. | 60/229 |
| 3,614,037 | 10/1971 | Vdolek ......................... | 244/110 B |
| 3,690,562 | 9/1972 | Smale .......................... | 244/110 B X |
| 3,716,207 | 2/1973 | Schweikl ...................... | 60/229 |

FOREIGN PATENTS OR APPLICATIONS

308,988  3/1969  Sweden ........................ 244/110 B

*Primary Examiner*—Trygve M. Blix
*Assistant Examiner*—Galen L. Barefoot
*Attorney, Agent, or Firm*—Watson, Cole, Grindle & Watson

[57] ABSTRACT

A jet engine is conventionally housed in a streamlined nacelle having a rearwardly tapering aft-section ending with a trailing edge surrounding the jet propulsion nozzle and presenting ahead of it one or more side outlets for issuing the engine exhaust flow when laterally deflected from said nozzle upon actuation of the thrust-reverser system. This tapering aft-section thus presents a rear annular peripheral zone extending between its side outlets and its trailing edge and having a continuous outer surface subdividable into peripherally alternate segments which lie respectively in longitudinal rearward extension of a side outlet and of an intermediate solid span between consecutive side outlet edges.

A controllable nacelle streamlining destroyer is fitted adjacent said solid span in order to project outwardly therefrom into the relative boundary airflow a thin sheet-like obstacle intercepting stream-lines thereof and causing them to separate from the following stretch of the nacelle aft-section outer surface.

9 Claims, 8 Drawing Figures

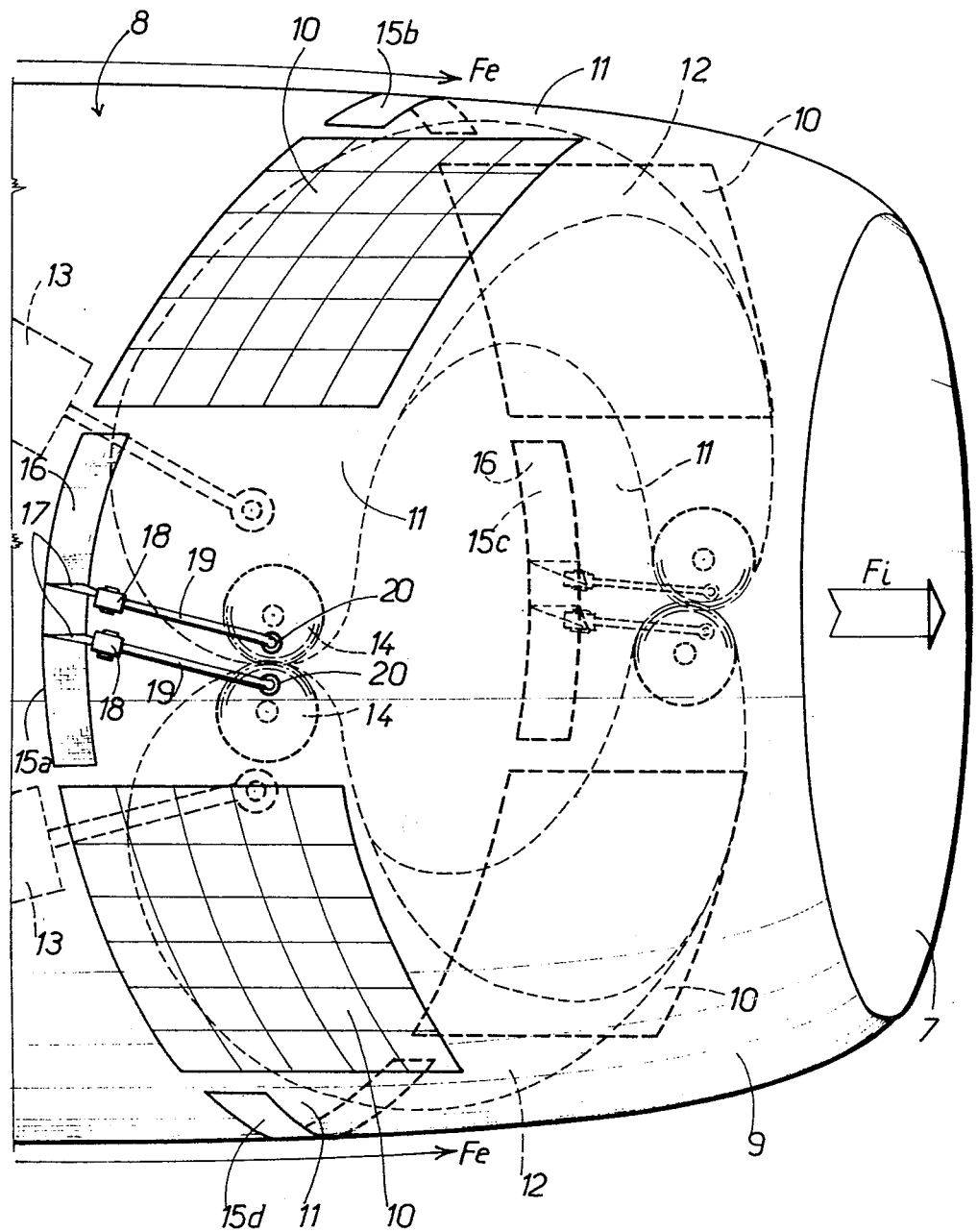

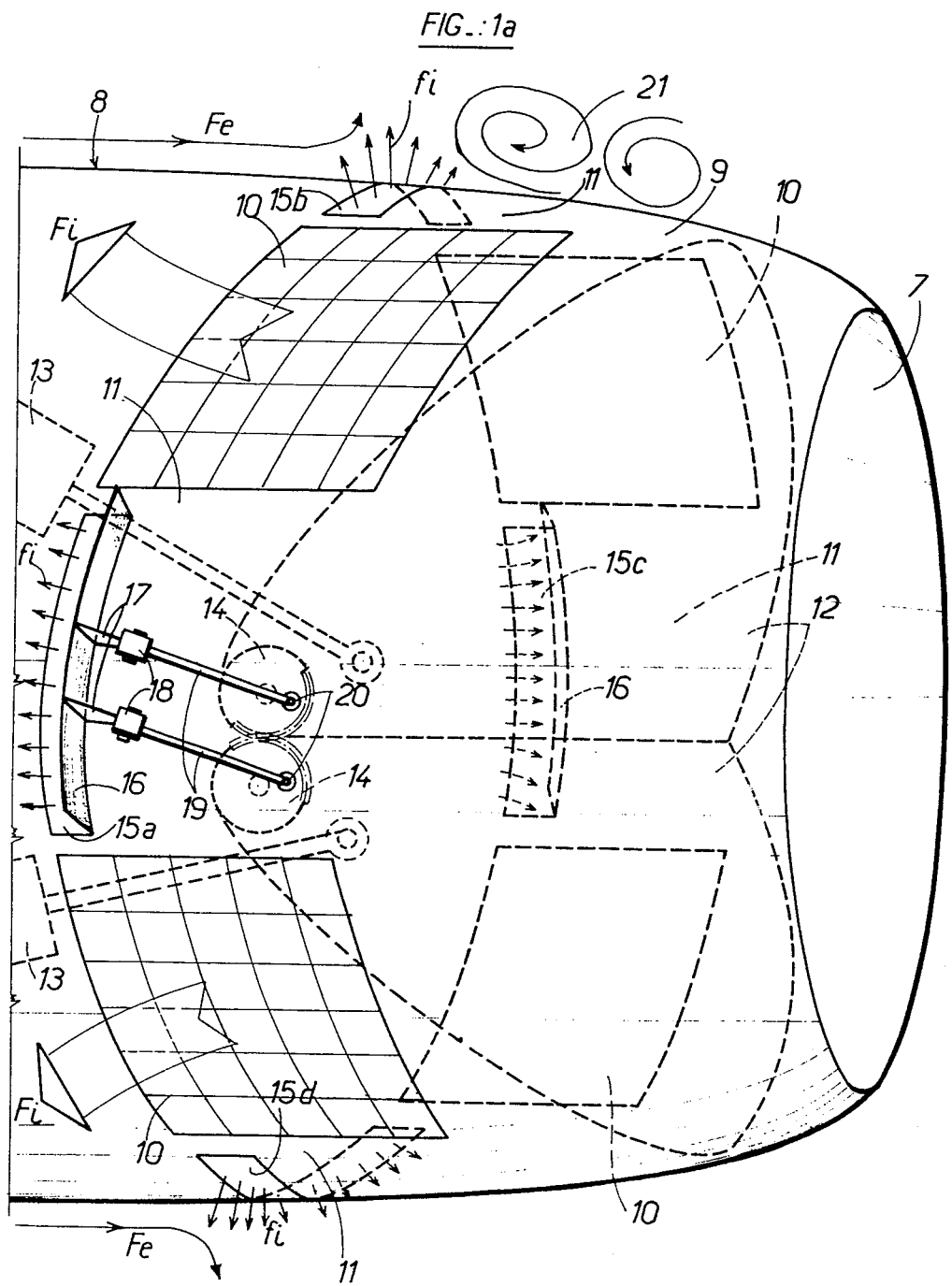
FIG.:1a

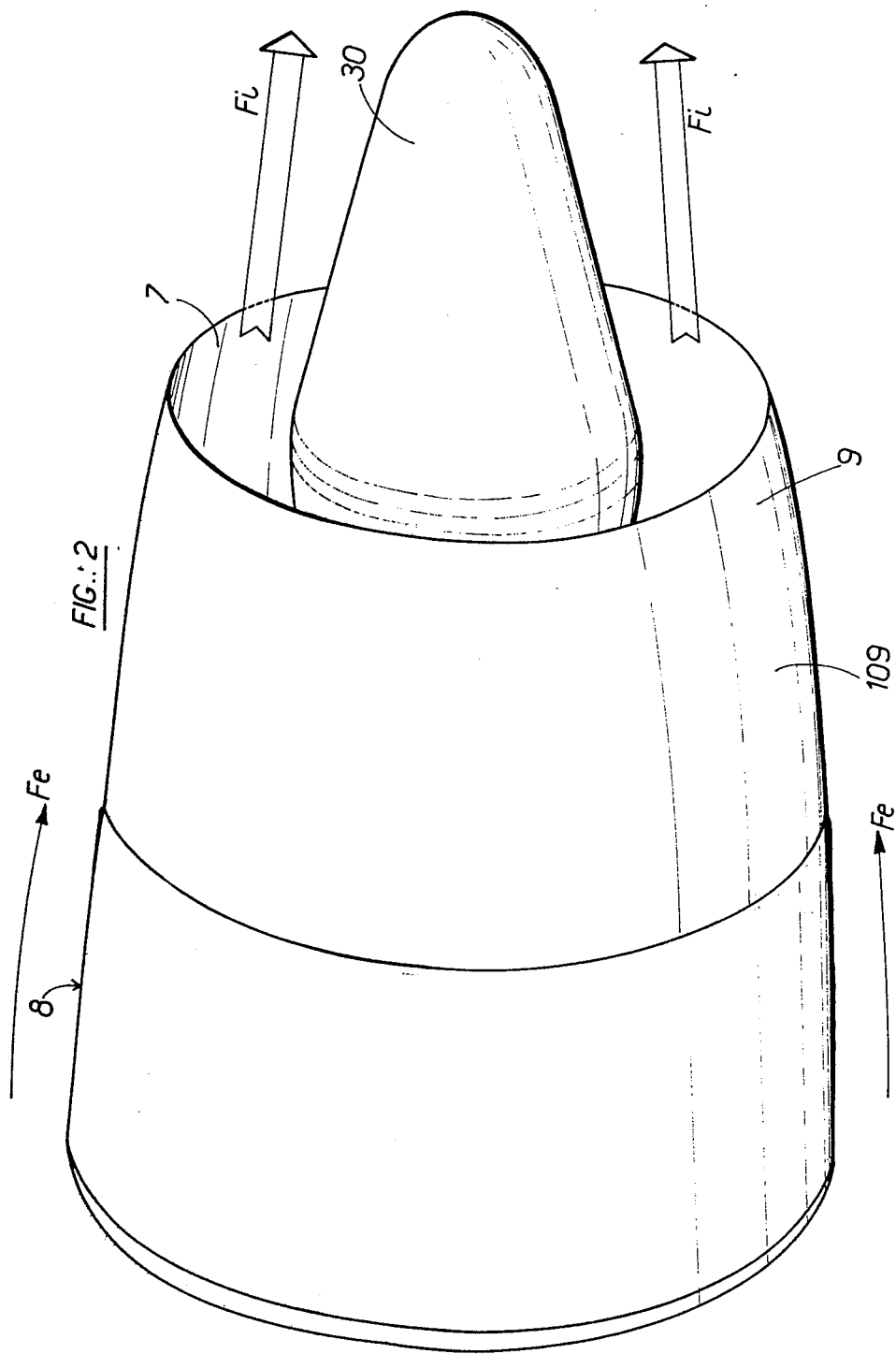

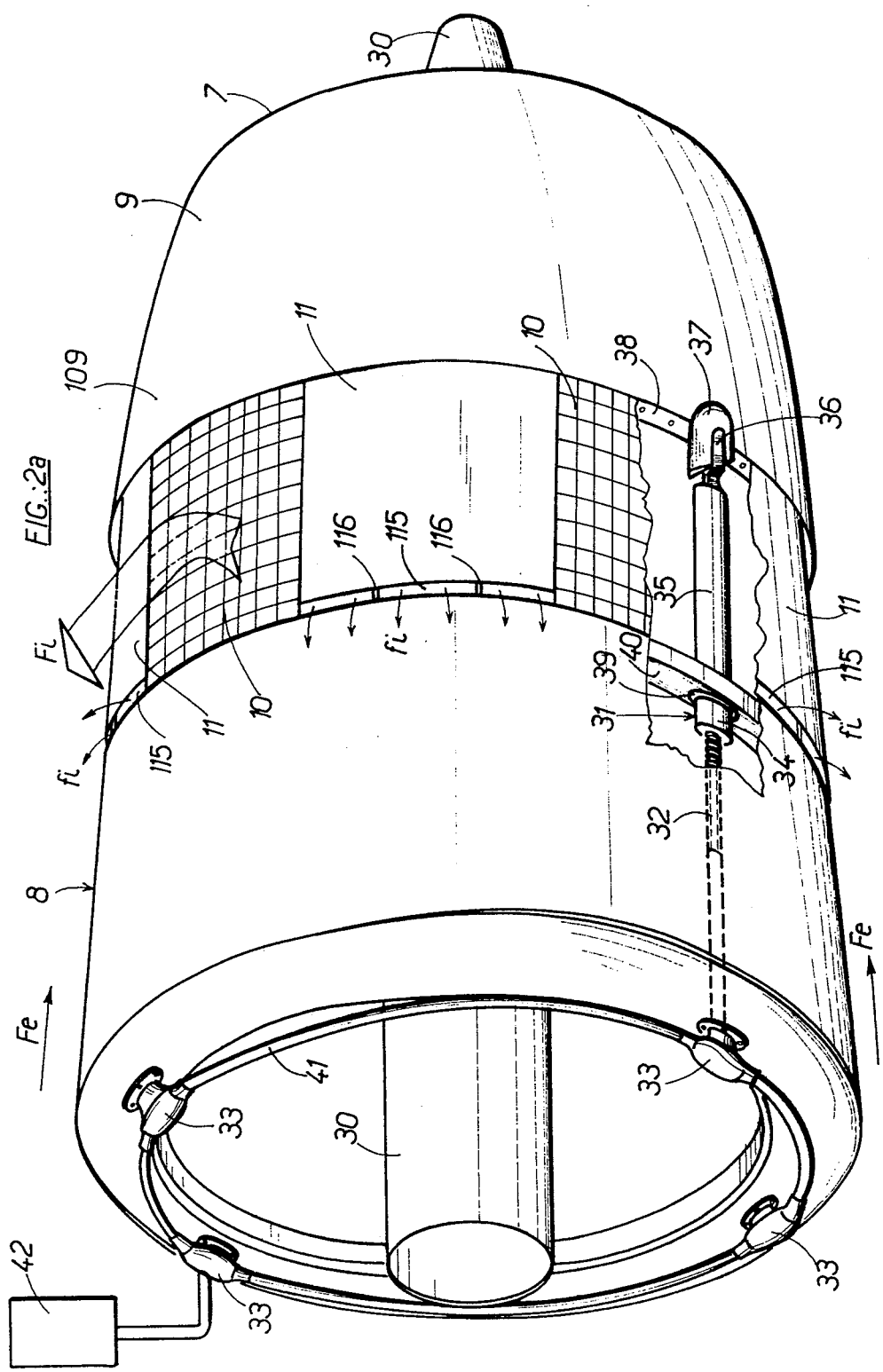

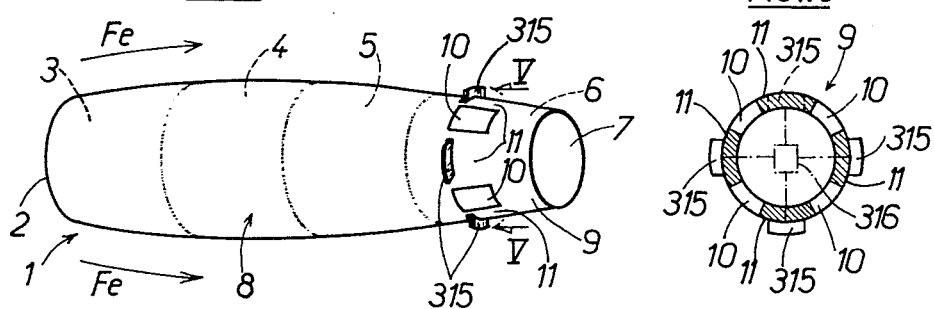
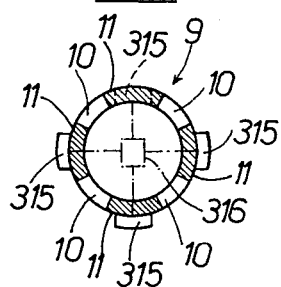
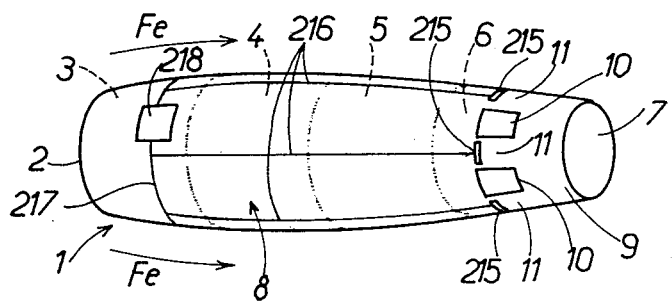
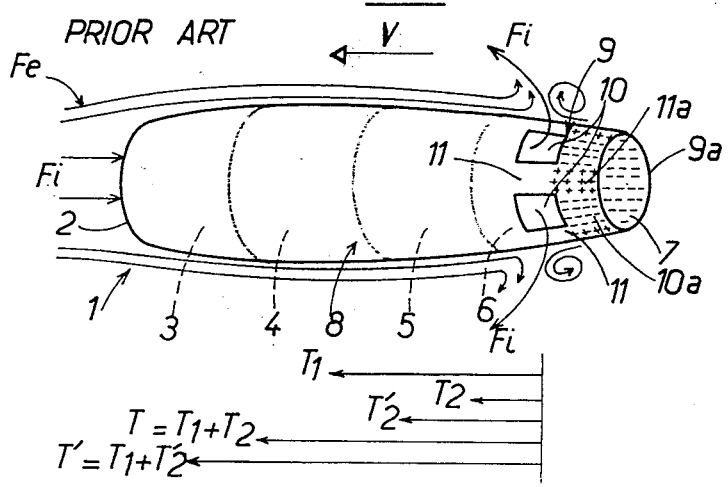

JET ENGINE NACELLE WITH DRAG AUGMENTER AUXILIARY FOR THRUST-REVERSER SYSTEM

This is a continuation-in-part of my co-pending application Ser. No. 338,531 filed Mar. 6, 1973.

Jet propulsion engines are currently equipped with a thrust-reverser system operable, as during landing of an aircraft immediately after touch-down, to deflect the gaseous exhaust flow from its normal axial direction towards the rear and have it issue instead with as large a forwardly-directed velocity component as possible, in order to produce a counter-thrust having a decelerating or braking effect. Such systems are well known and early typical embodiments are described, amongst others, in Assignee's U.S. Pat. Nos. 2,702,896 to Kadosch et al, 2,797,548 to Marchal et al, 2,807,137 to Meulien et al.

In the initial studies carried at that time on thrust-reverser systems, it was envisaged that (in order to ensure perfectly symmetrical deflection and thus avoid any risk of upsetting the aircraft attitude) the deflected gas flow would be discharged to the atmosphere along a continuous annulus coaxially extending all around the encasing structure containing the jet engine.

However, it became apparent that, in the surroundings, there were a number of "prohibited" regions in which it was not advisable to have hot motive gas, if the following detrimental situations were to be avoided:

the impact of hot gas upon the airframe (fuselage, wing, tail plane, undercarriage, tyres, etc . . . );

the reingestion by the jet engine of its own exhaust gases after their impact upon the ground, this reingestion being moreover frequently accompanied by the ingestion of entrained pebbles or other foreign bodies;

in the case of a multi-jet aircraft and in the event of a failure of one of the engines, the development of disturbing torques (in particular yawing) difficult to counteract for lack of controlled segmentation of the reversed jet.

The arrangement of a continuous annular discharge path extending all around the encasing structure furthermore raises complex design problems of strength of material and mechanical hold.

That is why this type of thrust-reverser system with a continuous annular discharge path for the deflected gas, has been discarded and replaced by a variant wherein the discharge path is arcuately restricted to "non prohibited" regions in which no detriment is to be feared, whereas the "prohibited" regions are masked by solid impervious stretches which preclude passage of deflected gases. A typical embodiment of such a variant is described in Assignee's U.S. Pat. No. 2,797,547 to Meulien et al.

On the other hand, it is now quite current to house jet engines in pad-mounted nacelles of streamlined shape designed in normal use for the relative flow of boundary air in adherence to its outer surface so as to minimize drag. Such nacelles end with a rearwardly tapering aft-section which terminates in a trailing edge around the jet propulsion nozzle and which presents at a distance ahead of this trailing edge one or, more often, several thrust-reversal side outlets for issuing the deflected engine exhaust flow when the thrust-reverser system is actuated. This tapering aft-section thus presents, between its side outlets and its trailing edge, a rear annular peripheral zone having a continuous outer surface subdividable into peripherally alternate segments which lie respectively in longitudinal rearward extension of a side outlet and of an intermediate solid span stretching between consecutive side outlet edges.

This conventional nacelle design will be better visualized by looking at FIG. 6 (labelled "prior art") of the accompanying drawings, which illustrates schematically a turbojet engine 1 normally employed to propel a vehicle, for example an aircraft which, at a given instant, is flying (or taxying) at a speed V.

The jet engine 1 comprises basically, from front to rear, an air intake 2, a compressor 3, a combustion chamber 4, a gas turbine 5 and a jet pipe 6 terminating in a propulsion nozzle 7. The jet engine is encased in a streamlined fairing or nacelle 8 having an aft-section 9 which is rearwardly tapered, that is to say has an outline which converges towards the rear, and which terminates in a trailing edge 9a around the jet propulsion nozzle 7.

In operation, the jet engine 1 is traversed by an internal gas flow $F_i$ which normally exhausts to the rear through the propulsion nozzle 7. Simultaneously, a relative boundary air flow $F_e$ flows over the streamlined outer surface of the nacelle 8 including its aft-section 9, and adheres to this surface.

Of the thrust-reverser system, FIG. 6 only shows a number of arcuately-spaced side outlets 10 for the lateral exhaust after deflection of all or at least a major portion of the internal gas flow $F_i$ with a forward-directed velocity component. The side outlets 10 extend arcuately over only a fraction of the perimeter of the nacelle aft-section 9 and are separated by arcuately spaced solid stretches 11 which span the adjacent edges of consecutive side outlets 10.

Adjustable deflector means, such as flaps or the like (not shown), make it possible to close off the jet pipe 6 at least partially and thereby deflect part at least of the internal gas flow $F_i$ through said thrust-reverser side outlets 10.

In this reverse thrust or braking configuration, the no longer fed nozzle 7 forms a negative (relatively speaking) or reduced pressure zone (region marked with minus signs) which gives rise to substantial base drag.

The deflected internal gas flow $F_i$ produces a gross counter-thrust $T_1$ which can be defined as the integral of the projections on to the axis of the jet engine 1, of the elementary counter-thrusts developed by each of the gas stream tubes deflected through the thrust-reverser side outlets 10. As far as the external boundary airflow $F_e$ is concerned, part of it encounters the deflected internal flow $F_i$ issuing from the thrust-reverser side outlets 10 and ceases to skim, and therefore separates from, those segments 10a of the aft-section 9 which are located to the rear of said thrust-reverser side outlets 10. This breakaway phenomenon is responsible for the appearance, on these segments 10a of the outer surface of the aft-section 9, of negative or reduced pressure regions marked with minus signs.

By contrast, the remainder of the boundary airflow $F_e$, i.e. that which does not encounter the deflected internal gas flow $F_i$ issuing from the side outlets 10, still sticks to the outer surface of the aft-section 9. Consequently (the flow $F_e$ being assumed to be subsonic), by reason of the rearward convergence (taper) of this aft-section 9, local recompression of this fraction of the boundary air-flow takes place. This recompression materializes by the appearance, on those other arcuately-spaced segments 11a of the outer surface of the aft-section 9 which lie in extension of its solid spans 11, of positive or over pressure zones marked with plus signs, the pressures generally increasing towards the rear.

Overall, the aft-section 9 of the nacelle, in the reverse thrust configuration, is subjected, by reason of the existence of the afore-mentioned reduced pressure and base drag areas, to a substantial drag which adds up to the gross counter-thrust $T_1$ produced by the deflected gas flow $F_i$. In other words, the total drag T of a nacelled jet engine, when in the reverse thrust configuration, can be regarded as being the sum of two terms $T_1$ and $T_2$ which characterize said configuration (to simplify matters, no account will be taken of other drag factors to which the jet engine is subjected anyway, whether or not it is in the reverse thrust configuration):

the term $T_1$ is the gross counter-thrust already defined hereinbefore;

the term $T_2$, referred to hereinafter as "interference drag" may be defined as the algebraic difference between, on the one hand, the drag $T_a$ of the aft-section 9 of the nacelle lying behind the side outlets 10, when the jet engine is in the reverse thrust configuration, and, on the other hand, the drag $T_b$ of said aft-section when the jet engine is in the normal or direct thrust configuration.

The drag factors $T_a$ and $T_b$ depend upon the flow conditions of the boundary airflow $F_e$ skimming the outer surface of the aft-section 9 of the nacelle 8, and upon those of the internal gas flow $F_i$ flowing through the jet engine. These drag factors can be calculated by forming the integral of the elementary drags produced by all the elementary surfaces of the aft-section of the nacelle, including those bounding the zone 7 through which the internal gas flow $F_i$ passes and which, when the jet engine is in the reverse thrust configuration, forms a subatmospheric pressure base as illustrated in FIG. 6.

Considering in particular the drag $T_b$ of the aft-section 9 of the nacelle 8 when the engine is in the normal or direct jet configuration, it is noted that this drag is in general of low or even negative value, due to the rearwardly tapering outline of this aft-section : there is developed along said taper, when the aircraft is in subsonic flight (and this is the case for an aircraft which is about to land), a re-compression of the external airflow which materializes as a positive thrust (or negative drag) exerting some propelling action sometimes vividly called the "soap-cake" or "cherry-stone" effect.

Referring back to FIG. 6, it will be seen therefore that the interference drag $T_2$ to which the nacelled jet engine 1 is subjected when in the reverse thrust configuration, is roughly the resultant of the drags induced by the reduced pressure base 7 and the reduced pressure segments 10a located right to the rear of the side outlets 10 (regions marked with minus signs), and of the counter-drag induced by the over pressure segments 11a located between the latter (regions marked with plus signs).

It has been found that the interference drag $T_2$ and consequently the total braking drag T, of such a nacelled jet engine, is far from constituting the optimum desirable value to achieve rapid braking of the vehicle to which the jet engine is fitted.

This deficiency is to be attributed to the maintenance of over/pressure (superatmospheric) on the segments 11a marked with plus signs in extension of the solid spans 11 when the thrust reverser is actuated, in contrast to the remainder of the aft-section which switches to subatmospheric pressure as shown by the minus signs.

In effect, not only do these overpressure segments 11a continue to exert a thrust to be deducted from the overall drag but they also "feed" air to the low pressure base 7, thereby raising its pressure level and correspondingly decreasing its drag effect. The base drag of the jet engine is thus not so pronounced as it would have been, had the overpressure segments 11a not existed.

The present invention originates from the determination and location of the above deficiency.

One of its main objects is to avoid such maintenance of overpressure on part of the nacelle aft-section when the thrust-reverser system is actuated, and even to have this part switch from overpressure to negative pressure in consistency with the rest of the nacelle aft-section, so that the critical part will not only cease to be the seat of a thrust to be deducted from the overall drag, but will itself become the seat of an additional drag which adds up to it. In other words, the above defined interference drag $T_2$ increases to $T'_2$ (FIG. 6) and the overall drag T correspondingly increases to $T'$.

This main object of the present invention is attained by interfering with the boundary airflow along the outer surface of the aft-section of the nacelle so as to separate it from the segments thereof to which it would otherwise adhere, these segments being those which lie in rearward extension of the solid spans between adjacent edges of consecutive side outlets for the deflected exhaust flow.

Another object of the present invention is to provide a drag augmenter auxiliary for the thrust-reverser system of a nacelled jet engine. For this purpose, a controllable nacelle-streamlining destroyer is fitted on or near — and preferably at the upstream end of — each solid span in order to project therefrom into the boundary airflow a thin sheet-like obstacle, whether solid or fluid, acting like a spoiler.

These and other objects will become apparent from the ensuing description given with reference to the accompanying drawings in which :

FIGS. 1 and 1a are perspective views, in two different configurations, of a drag augmenter auxiliary in accordance with a first embodiment of the invention;

FIGS. 2 and 2a are perspective views, in two different configurations, of a drag augmenter auxiliary in accordance with an alternative embodiment of the invention;

FIGS. 3 and 4 are schematic views, in longitudinal elevation, of a drag augmenter auxiliary in accordance with two other alternative embodiments of the invention respectively;

FIG. 5 is a cross-section on the line V—V of FIG. 4; and

FIG. 6 is a schematic view designed to illustrate the problem set forth hereinabove.

FIGS. 1 and 1a show the aft-section 9 of the nacelle 8, the nozzle 7 and the thrust-reverser side outlets 10 (for example numbering four and at 90° to each other) which are separated by intermediate solid spans 11. The thrust-reverser side outlets 10 are equipped with deflecting blade cascades (not shown in detail) designed to impart to the internal gas flow $F_i$ laterally deflected into said side outlets, a forwardly-directed velocity component.

Two adjustable "eyelid" flaps 12 in the form of mantrap jaws and controllable by means of jacks 13, can occupy either one of two positions shown respectively in FIGS. 1 and 1a.

When the jet engine 1 is in the normal or forward-thrust configuration (FIG. 1), the eyelids 12 are in retracted position to close off the side outlets 10 and open the passage to the nozzle 7. The internal gas flow $F_i$ then exhausts towards the rear through the nozzle 7.

When the jet engine is in the braking or reverse-thrust configuration (FIG. 1a), the eyelids 12 are swung to close off the nozzle 7 and open the side outlets 10. The internal gas flow $F_i$ then exhausts therethrough laterally and forwardly, giving rise to a braking counter-thrust.

The movements of the two eyelids 12 are synchronized by means of meshing gears 14.

The above-described arrangement of FIGS. 1 and 1a is quite conventional in the field of nacelled jet engines equipped with a thrust-reverser system, and further details appear unnecessary for the proper comprehension of the invention, the gist of which lies in a combination of such conventional arrangement with a drag augmenter auxiliary designed to come into play when the thrust-reverser system is actuated for braking purposes.

In the embodiment illustrated in FIGS. 1 and 1a, the drag augmenter auxiliary of the invention comprises thin slot-like nozzles 15a, 15b, 15c, 15d (also numberin four and at 90° to each other) extending along circular arcs on respective intermediate solid spans 11 of the aft-section 9 of the nacelle 8, preferably in a same transverse plane located at the upstream end of these solid spans 11. The adjective "thin" as used to qualify these slot-like nozzles, means that they have a very small dimension parallel to the nacelle axis compared to the corresponding axial dimension of the conventional side outlets 10. Moreover, while the arcuate extent of the nozzles 15 may be of the same order as that of the side outlets 10, the area of the nozzles 15 will be much smaller than that of the side outlets 10.

It will therefore be apparent to anyone skilful in the art that the nozzles 15 are in no way to be confused with or assimilitated to the conventional side outlets 10 which are assigned to the thrust-reverser system, form an integral part thereof and suffice for exhausting the deflected internal flow Fi when the jet propulsion nozzle 7 is closed and therefore unavailable. It will also be apparent that the very location of such slot-like nozzles 15 requires the pre-existence of solid spans 11 intermediate the side outlets 10 and, in contrast thereto, impervious to the internal flow Fi, which implies the provision of an arcuate succession of like geometrical surface portions which are alternately pervious (as at 10) and impervious (as at 11) to said internal flow Fi.

The diametrically-opposite slots 15b and 15d are closed off by the eyelids 12 when the latter are in retracted position corresponding to forward-thrust configuration (FIG. 1), and are opened when said eyelids 12 are swung into the reverse thrust configuration (FIG. 1a).

The other diametrically-opposite slots 15a and 15c are provided with obturators 16 articulated about the respective downstream edges of said slots and designed to open when the eyelids 12 occupy their reverse thrust position (FIG. 1a). To this end, the obturators 16 are fitted with bellcrank levers 17 to which are hinged the yokes 18 of connecting links 19. The other end of each of these yokes carries a ball joint articulated to the toothed gears 14.

In operation, the four slots 15a, 15b, 15c, 15d, open simultaneously when the eyelids 12 are swung into their reverse thrust position. Through these slots, sheet-like screens of pressurised fluid are projected into and transversely of the boundary airflow $F_e$. This pressurized fluid is but a minor fraction $f_i$ of the internal gas flow $F_i$ which essentially exhausts through the much larger side outlets 10. The area of the aforesaid slots is small enough compared with that of the side outlets so that the mass flow rate (or power) per unit angular extension along the periphery of the aft-section, of said fraction $f_i$ issuing from the slots 15 is of a much smaller order of magnitude than the mass flow rate (or power) per unit angular extension along the periphery of the aft-section, of the stream issuing from the conventional side outlets 10.

This basic difference in nature between the two kinds of lateral openings : on the one hand the conventional side outlets 10 and on the other hand the novel slot-like nozzles 15, is readily understood when bearing in mind that the outlets 10 are designed to exhaust the huge mass flow traversing the jet propulsion unit and must therefore be sizable, whereas the slots 15 are only designed to have a very limited and localized action on the boundary layer of the external airflow Fe over the solid spans 11 and are therefore largely undersized in comparison with the outlets 10.

The sheet-like fluid screens issuing from the slots 15 crosswise of the boundary airflow $F_e$ create, in each of the aforesaid intermediate spans 11, a disturbance which causes separation of said boundary airflow from the outer surface of the aft-section 9. This breakaway phenomenon in turn gives rise to the development of low-pressure turbulence zones such as shown at 21 (FIG. 1a) downstream of the aforesaid slots 15.

It is noteworthy that the aft-section 9, which theoretically should be rather elongated (and therefore have a small angle of taper) in order to provide optimum performance in the normal forward-thrust configuration, is in practice, for reasons of reduction of mass, designed with a length which is reduced (and therefore a taper angle which is increased) up to an acceptable limit, consistent with the avoidance, in the forward-thrust configuration, of any breakaway of the boundary airflow $F_e$. This obviously implies that said aft-section operates right from the start under aerodynamic conditions close to breakaway, so that even a minimal disturbance will suffice to trigger and maintain such breakaway when it is desired. This is why only a very low energy is required to activate the aforesaid thin slots 15 in order to produce the desired effect.

The result of all this is that when the jet engine 1 is in the reverse-thrust configuration, the boundary airflow $F_e$ breaks away substantially over the whole of the perimeter of the aft-section 9. The over-pressure regions represented at 11a on FIG. 6 then disappear and with them the drawbacks which they created.

An improved jet engine in accordance with the invention thus has an interference drag $T'_2$ and a total braking drag $T'$, which are substantially increased (see FIG. 6).

From the standpoint of drag, therefore, everything happens as if the deflected exhaust flow were discharged through a continuous annular path extending all around the perimeter of the aft-section 9. It is to be noted however that this advantage with regard to drag is not obtained at the expense of other drawbacks which would result from the use of a true continuous reverse-thrust annular path, by reason of the very small power of the jets $f_i$ which escape through the slots 15a, 15b, 15c, 15d. These jets, whose sole function is to create a relatively tiny disturbance in the boundary airflow $F_e$, are rapidly diluted in the atmosphere so that their impact (if any) upon the ground or the airframe, has no serious consequence. In addition, their momentum is sufficiently low not to produce any insurmountable imbalance in the event of a sudden failure of a symmetrical jet engine.

FIGS. 2 and 2a illustrate a second embodiment in accordance with the invention applicable especially to a jet engine of the needle or plug type.

In these Figures, the nacelle or similar structure 8, the aft-section 9, the jet propulsion nozzle 7 and the reverse-thrust side outlets 10 (for example here again four in number and at 90° to each other) separated by respective intermediate solid spans 11, can be seen. The jet propulsion nozzle 7 is here of the needle or plug type, or in other words provided with a central body 30, and can be closed off completely by means of flaps (not shown) which seat (in the closed position) on said plug or central body 30.

The aft-section 9 comprises a fairing 109 assembled to slide axially between two terminal positions illustrated respectively in FIGS. 2 and 2a. The axial displacement of the fairing is produced by screw jacks 31 each of which has a threaded rod 32 rotated by a transmission gear 33. The threaded rod 32 rotates in a threaded sleeve 34 fixed to a hollow tube 35 itself attached, through the medium of a ball joint 36 and a yoke 37, to a structure 38 integral with the fairing 109. As FIG. 2a shows, the tube 35 is guided through a passage 39 formed in a ring 40 integral with the body of the nacelle 8. When the threaded rods 32 are rotated, the fairing 109 is imparted with a translational movement either forwards or backwards.

The various gears 33 are interconnected by flexible synchronizing drives 41 and are rotated by a motor 42, for example a pneumatic motor.

In accordance with the invention, auxiliary drag augmenter means are provided on the aft-section 9, at the aforesaid intermediate solid spans 11. These auxiliary means, here again, take the form of thin slots 115 whose major dimension extends circumferentially of the said aft-section 9. As FIG. 2a shows, the slots are interrupted only by bridge pieces 116 which ensure mechanical continuity of the nacelle 8, these bridge pieces being streamlined in order to produce as little disturbance as possible to the continuity of the sheet-like jets escaping through the slots 115.

When the jet engine is in the forward-thrust configuration (FIG. 2), the fairing 109 closes off both the reverse-thrust side outlets 10 and the slots 115. The internal gas flow $F_i$ then exhausts towards the rear through the jet propulsion nozzle 7.

When the jet engine is in the reverse-thrust configuration (FIG. 2a), the fairing 109 simultaneously uncovers the reverse-thrust side outlets 10 and the slots 115. The internal gas flow $F_i$ then exhausts from these side outlets 10 laterally and forwardly, giving rise to a counter-thrust. In addition, thin sheet-like jets $f_i$ of pressurized fluid issue from the slots 115 and produce breakaway or separation of the boundary airflow $F_e$ under conditions and with a result similar to those already explained hereinbefore in relation to FIGS. 1 and 1a. It will be observed that here again the width of the slots 115 is chosen so that the mass flow rate (or power) per unit angular extension along the periphery of the aft-section, of the boundary airflow disturbing sheet-like jets $f_i$, is of a much smaller order of magnitude than that of the mass flow rate (or power) per unit angular extension along the periphery of the aft-section, of the deflected gas stream exhausting through the reverse-thrust side outlets 10.

FIG. 3 illustrates a third embodiment in accordance with the invention, in which the basic elements already described hereinbefore are encountered once again in particular the reverse-thrust side outlets 10 separated by as many intermediate solid spans 11.

In accordance with the invention, when the jet engine is in the reverse-thrust configuration, means are provided to project, into the boundary airflow $F_e$ on the intermediate spans 11 of the aft-section 9 and transversely of said boundary airflow, sheet-like jets of pressurized fresh air, the power of which per unit angular extension along the periphery of the aft-section is of a much smaller order of magnitude than the power per unit angular extension along the periphery of the aft-section of the deflected internal gas flow exhausting through the reverse-thrust side outlets 10.

To this end, thin injection slots 215 are formed between the thrust-reverser side outlets 10. These slots are supplied with pressurized fresh air through pipes 216 connected to an annular manifold 217 itself supplied with air tapped from the compressor 3. A valve device 218 ensures that the air supply to the manifold 217 (and consequently to the slots 215) is cut off when the jet engine is in the normal forward-thrust configuration.

The disturbing action produced upon the boundary air-flow $F_e$ by the sheet-like jets of air issuing from the slots 215, is similar to that produced by the sheet-like jets of hot gas issuing from the slots 15a, 15b, 15c, 15d (FIG. 1a) or 115 (FIG. 2a).

FIGS. 4 and 5 illustrate a fourth embodiment in accordance with the invention, in which, likewise, the basic elements already described are encountered yet again, in particular the reverse-thrust side outlets 10 separated by the intermediate solid spans 11.

In accordance with the invention the aft-section 9 is equipped, in said intermediate spans 11, with thin mechanical obstacles or spoilers 315 extending in the peripheral direction and adjustable in position by means of a control device 316 whose operation is synchronized with that of the thrust-reverse system.

In the example illustrated, these obstacles are constituted by four spoilers. Three of those have been shown in the "out" position, in which they project into the boundary airflow $F_e$ on said intermediate spans 11. The fourth has been shown in the "retracted" position in which it is withdrawn into the thickness of the wall of the aft-section 9.

When the jet engine 1 is in the normal forward-thrust configuration, all the spoilers 315 are retracted.

When the jet engine 1 is in the braking or reverse-thrust configuration, the spoilers 315 project into the boundary airflow $F_e$, exerting a disturbing action upon it so that, as in the former cases, it separates or breaks away from the outer surface of the aft-section 9 and thus increases the interference drag $T_2$ of the jet engine.

I claim:

1. A nacelle housing a jet propulsion engine equipped with a rearwardly-directed jet propulsion nozzle and a thrust-reverser system actuatable to deflect laterally the engine exhaust flow from said jet propulsion nozzle, said nacelle having a streamlined outer surface so designed that in normal operation the relative flow of boundary air adheres thereto along substantially all its fore-to-aft extension including a rearwardly tapering aft-section which ends with a trailing edge around said jet propulsion nozzle and which presents two successive annular peripheral zones, namely:

a front annular peripheral zone located at a distance ahead of said trailing edge and comprising, in peripheral alternation, at least one thrust-reversal side outlet bounded circumferentially by two opposite arcuately-spaced edges and having a total passage area designed for issuing said laterally-deflected engine exhaust flow, and at least one solid impervious span between consecutive side outlet edges, extending over a sufficient segmentary extension of the periphery of said aft-section to shield effectively adjacent environment from said laterally-deflected engine exhaust flow, and a rear annular peripheral zone extending between said front annular peripheral zone and said trailing edge and having a solid continuous outer surface subdividable into peripherally alternate first and second segments which lie respectively in longitudinal rearward extension of said thrust-reversal side outlet and of said solid impervious span, whereby said impervious span and said second segment in longitudinal rearward extension thereof form together a longitudinally-continuous solid stretch of the outer surface of said rearwardly tapering aft-section, wherein the improvement comprises a controllable auxiliary device which is operatively associated with said solid stretch to act with respect thereto as a localized nacelle-streamlining destroyer, said device comprising:

transiently activatable means located adjacent said solid impervious span and extending substantially between said side outlet edges for positively causing said relative boundary airflow to separate from said second segment lying in longitudinal rearward extension of said solid impervious span, and control means for selectively activating said transiently activatable means in conjunction with the actuation of said thrust-reverser system, thereby switching said relative boundary airflow from an aerodynamic condition of flow adherence to said second segment, to an aerodynamic condition of flow separation therefrom.

2. Nacelle as claimed in claim 1, wherein said transiently activatable means comprises means for projecting outwardly from the nacelle outer surface and generally transversely to said relative boundary airflow, a thin sheet-like obstacle intercepting the stream-lines thereof flowing in contact engagement with said outer surface.

3. Nacelle as claimed in claim 2, wherein said thin sheet-like obstacle extends generally in a transverse plane of said nacelle and is projectable in a generally radial direction with respect thereto.

4. Nacelle as claimed in claim 3, wherein said transverse plane is located adjacent the fore end of said solid impervious span.

5. Nacelle as claimed in claim 3, wherein said obstacle comprises a solid flat spoiler in the form of a retractable platelet.

6. Nacelle as claimed in claim 3, wherein said obstacle comprises a screen-like jet issuing from a slot-like nozzle fed with pressure fluid.

7. Nacelle as claimed in claim 6, wherein said slot-like nozzle is fed with compressed air providing from a fore part of said jet propulsion engine.

8. Nacelle as claimed in claim 6, wherein said slot-like nozzle is fed with pressure gas providing from a rear part of said jet propulsion engine.

9. Nacelle as claimed in claim 6, wherein the total side outlet passage area is far larger than the total slot-like nozzle area.

* * * * *